(12) United States Patent
Branecky

(10) Patent No.: US 6,856,115 B2
(45) Date of Patent: Feb. 15, 2005

(54) METHOD OF AND APPARATUS FOR CONTROLLING THE OPERATION OF AN INDUCTION MOTOR USING A MODEL OF THE INDUCTION MOTOR

(75) Inventor: Brian Thomas Branecky, Oconomowoc, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 124 days.

(21) Appl. No.: 10/284,908

(22) Filed: Oct. 31, 2002

(65) Prior Publication Data
US 2004/0085042 A1 May 6, 2004

(51) Int. Cl.[7] .............................................. H02P 5/34
(52) U.S. Cl. ..................... 318/727; 318/729; 318/432; 318/801
(58) Field of Search ................................ 318/727, 729, 318/798, 801, 805, 808, 799, 432, 812, 139, 821; 363/39, 40; 323/205–210

(56) References Cited

U.S. PATENT DOCUMENTS

| | | | |
|---|---|---|---|
| 3,529,223 A | 9/1970 | Vergez, Jr. | |
| 3,983,463 A | 9/1976 | Nabae et al. | |
| 3,989,991 A | 11/1976 | Brennen et al. | |
| 4,326,157 A | 4/1982 | Herbert | |
| 4,392,100 A | * 7/1983 | Stanton et al. | 318/803 |
| 4,400,655 A | 8/1983 | Curtiss et al. | |
| 4,442,393 A | * 4/1984 | Abbondanti | 318/802 |
| 4,469,997 A | 9/1984 | Curtiss et al. | |
| 4,482,852 A | 11/1984 | Muskovac | |
| 4,677,360 A | * 6/1987 | Garces | 318/803 |
| 4,823,066 A | * 4/1989 | Yoshiki et al. | 318/798 |
| 4,967,135 A | 10/1990 | Ashikaga et al. | |
| 5,032,771 A | 7/1991 | Kerkman et al. | |
| 5,066,899 A | 11/1991 | Nashiki | |

(List continued on next page.)

Primary Examiner—Rina Duda
Assistant Examiner—Eduardo Colon Santana
(74) Attorney, Agent, or Firm—Michael Best & Friedrich LLP (57) ABSTRACT

A controller for a motor and a method for controlling the operation of the motor. The controller includes a model of the motor, where the model is utilized to determine modeled values of first and second motor variables. An estimated value of slip is adjusted based at least in part on a comparison of the modeled value of the second motor variable and an estimated value of the second motor variable which is based at least in part on a value of bus voltage and a value of bus current. As the estimated value of slip is adjusted, the modeled values are updated and the voltage utilized to energize the motor is thereby updated to provide control of the motor based on the control of the first motor variable.

66 Claims, 3 Drawing Sheets

U.S. PATENT DOCUMENTS

| | | | |
|---|---|---|---|
| 5,155,797 A | * 10/1992 | Nomura et al. | 388/815 |
| 5,159,255 A | 10/1992 | Weber | |
| 5,272,428 A | 12/1993 | Spiegel et al. | |
| 5,278,486 A | 1/1994 | Kim | |
| 5,296,794 A | * 3/1994 | Lang et al. | 318/715 |
| 5,321,599 A | 6/1994 | Tanamachi et al. | |
| 5,334,923 A | 8/1994 | Lorenz et al. | |
| 5,442,271 A | * 8/1995 | Hatanaka et al. | 318/729 |
| 5,444,351 A | * 8/1995 | Yamamura et al. | 318/811 |
| 5,479,081 A | * 12/1995 | Seibel et al. | 318/805 |
| 5,500,581 A | 3/1996 | Hatanaka et al. | |
| 5,502,360 A | * 3/1996 | Kerkman et al. | 318/805 |
| 5,521,482 A | 5/1996 | Lang et al. | |
| 5,541,488 A | * 7/1996 | Bansal et al. | 318/801 |
| 5,731,682 A | 3/1998 | Yamakawa | |
| 5,754,026 A | 5/1998 | Hampo et al. | |
| 5,796,236 A | 8/1998 | Royak | |
| 5,796,237 A | 8/1998 | Yamakawa | |
| 5,828,199 A | 10/1998 | Tajima et al. | |
| 5,861,728 A | 1/1999 | Tazawa et al. | |
| 5,959,429 A | 9/1999 | Tajima et al. | |
| 5,965,995 A | * 10/1999 | Seibel et al. | 318/805 |
| 5,969,498 A | 10/1999 | Cooke | |
| 6,014,007 A | * 1/2000 | Seibel et al. | 318/805 |
| 6,075,337 A | 6/2000 | Ishii et al. | |
| 6,075,338 A | 6/2000 | Mazza et al. | |
| 6,104,148 A | 8/2000 | Kumar et al. | |
| 6,121,748 A | 9/2000 | Yamakawa et al. | |
| 6,222,335 B1 | * 4/2001 | Hiti et al. | 318/432 |
| 6,433,504 B1 | * 8/2002 | Branecky | 318/727 |
| 6,433,506 B1 | * 8/2002 | Pavlov et al. | 318/804 |
| 6,605,919 B1 | * 8/2003 | Branecky | 318/729 |
| 6,636,011 B2 | * 10/2003 | Sadasivam et al. | 318/727 |
| 6,720,751 B2 | * 4/2004 | Plasz et al. | 318/567 |

* cited by examiner

METHOD OF AND APPARATUS FOR CONTROLLING THE OPERATION OF AN INDUCTION MOTOR USING A MODEL OF THE INDUCTION MOTOR

BACKGROUND OF THE INVENTION

The invention relates to induction motors. More particularly, the invention relates to a method and apparatus for controlling the operation of an induction motor using a model of the induction motor.

Various control schemes have been used to control the operation of induction motors. Nevertheless, an improved control scheme that provides straightforward, reliable operation, and that is simple and less expensive to manufacture would be welcomed by those in the art.

SUMMARY OF THE INVENTION

The methods and apparatus of the invention provide motor control through the utilization of a model of the motor. In one embodiment, a control circuit or controller is connected to the motor to provide the motor control. The controller acts as an "observer" of the motor to determine values of the motor variables necessary to provide motor control without directly measuring from the motor the values of the motor variable or other values necessary to calculate the values of the motor variables. Instead, the controller utilizes commanded values of excitation speed and motor voltage and measured values of bus voltage and bus current to determine such values. In one embodiment, an inverter includes the bus voltage and the bus current and supplies a voltage to the motor based on a command signal provided by the controller. In some embodiments, the controller may also utilize other values measured from the inverter to determine the values necessary to calculate the values of the motor variables.

The controller thus eliminates the need for sensing devices coupled to the motor and circuitry necessary to convert such sensed signals. Additionally, values necessary to calculate the values of the motor variables may be obtained from the inverter using fewer and/or less expensive components. Therefore, the controller can be implemented using fewer and less expensive circuitry components than previous control schemes.

The model utilized to provide motor control is a simplified model, thus allowing for utilization of less powerful processors. A less powerful processor in combination with an overall fewer number of circuitry components allows for the production of a less expensive controller.

Other features of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," and "coupled" are used broadly and encompass both direct and indirect mountings, connections, and couplings. Further, "connected" and "coupled" are not restricted to physical or mechanical connections or couplings.

Figure 1:
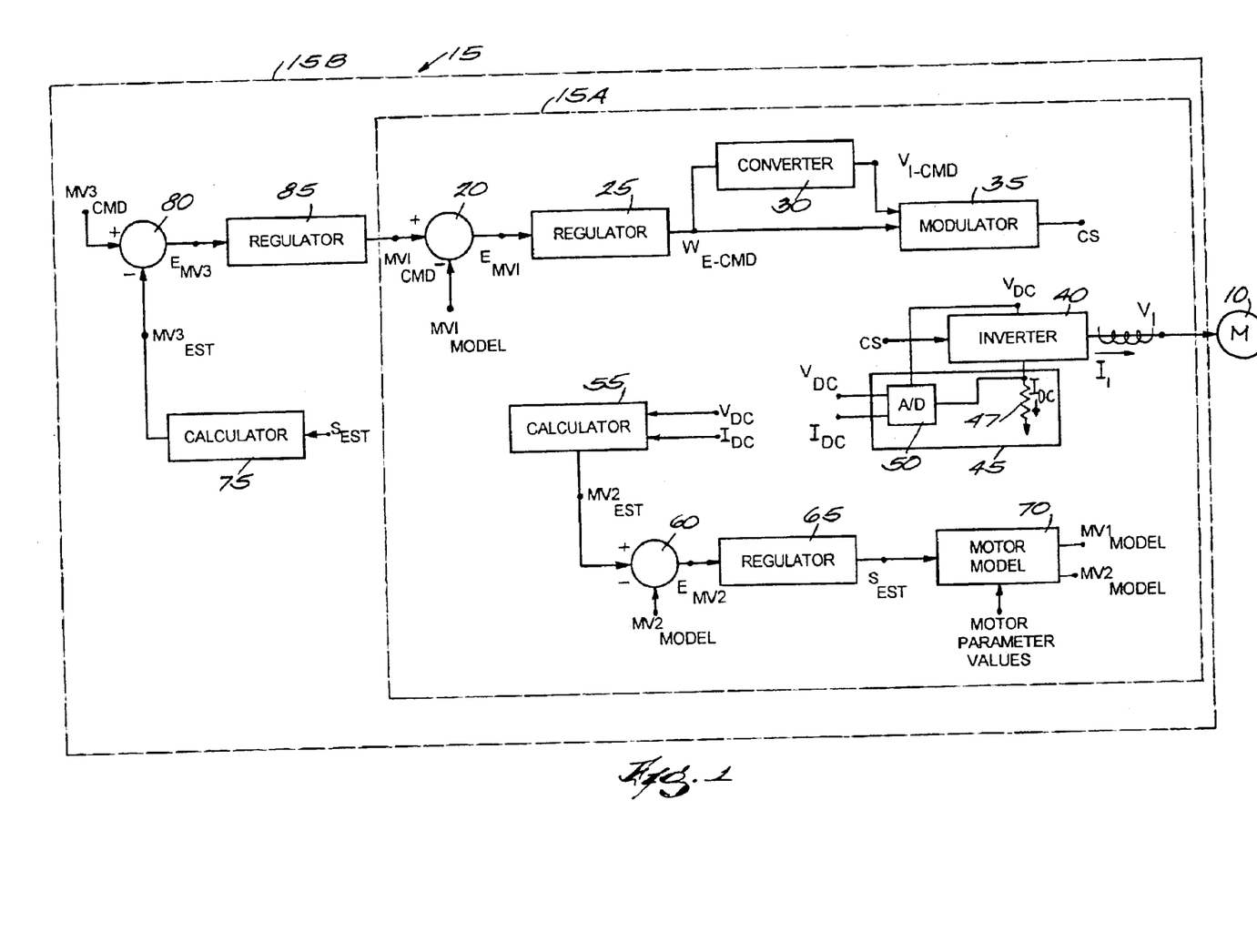
FIG. 1 is a schematic diagram of an induction motor and a controller connected to the induction motor.
Figure 2:
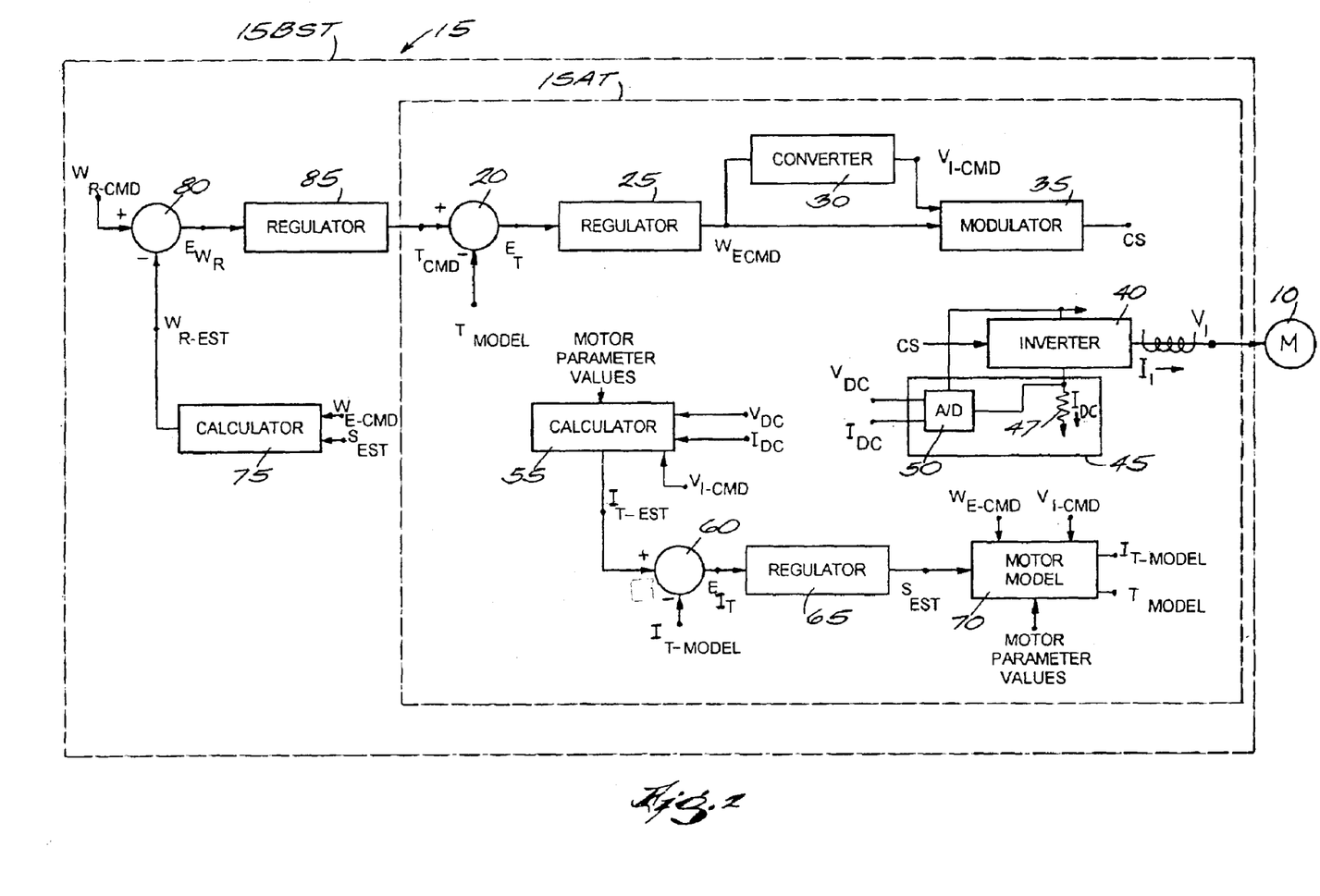
FIG. 2 is a schematic diagram of another embodiment of the controller shown in FIG. 1.

Shown in FIGS. 1 and 2 of the drawings are schematic views of an induction motor 10 and a controller 15 connected to the motor 10. The details of the induction motor 10 are commonly known in the art. Accordingly, the induction motor is not described in detail. Aspects of the controller 15 may also be useful for the control of other types of motors (e.g., permanent magnet brushless DC motors, etc.).

In one embodiment, the controller 15 is implemented using a programmable device (e.g., a microprocessor, a microcontroller, a digital signal processor (DSP), etc.) that utilizes software stored in a memory and at least one discrete power component (e.g., an inverter, a measuring circuit, etc.). As will be apparent to those of ordinary skill in the art, some of the software may be implemented in hardware using mechanisms such as hardware descriptor language to create application specific or special purpose circuits. Accordingly, elements described herein should not necessarily or inevitably be limited to a software or hardware embodiment simply because examples given are set forth in hardware or software specific terms. Further, although the software is illustrated as a number of separate elements or modules, the functionality of such elements can be combined into fewer elements or separated into more elements.

As shown in FIG. 1, the controller 15 includes controllers 15A and 15B. The controller 15A provides individual control of any variable of the motor 10 (e.g., torque, speed, slip, efficiency, flux, etc.) that is described by a model of the motor 10. To perform such control, the controller 15A includes a first comparator 20, a first regulator 25, a frequency-to-voltage converter 30, a modulator 35, an inverter 40, a measuring circuit 45 having a current sensor 47 and an analog-to-digital (A/D) converter 50, a calculator 55, a second comparator 60, a second regulator 65, and a motor model module 70. The controller 15A controls the operation of the motor 10 by controlling a first motor variable MV1 of the motor 10 using a second motor variable MV2 of the motor 10.

The first comparator 20 compares a commanded value of the first motor variable $MV1_{CMD}$ and a modeled value of the first motor variable $MV1_{MODEL}$. The first comparator 20 outputs an error $E_{MV1}$ that represents the difference between the commanded value $MV1_{CMD}$ and the modeled value $MV1_{MODEL}$. In one embodiment, the commanded value $MV1_{CMD}$ is provided based at least in part on a user input to the environment of the motor 10 and the controller 15 (e.g., adjustment of a thermostat of an heating, ventilation, and air conditioning (HVAC) system where the motor 10 is used to drive a blower of the HVAC system and the controller 15 controls such operation). The modeled value MV1 MODEL is determined by the motor model module 70 as discussed below. The error $E_{MV1}$ is supplied to the first regulator 25. If the commanded and modeled values $MV1_{CMD}$ and $MV1_{MODEL}$, respectively, are the same value, the value of the error $E_{MV1}$ is equal to zero.

The first regulator 25 receives the error $E_{MV1}$ as an input and generates an output of a commanded value of excitation speed $\omega_{E-CMD}$. The first regulator 25 increments or decrements the previous value of the commanded value of excitation speed $\omega_{E-CMD}$ based on the value of the error $E_{MV1}$, thereby generating a new value for the commanded value of excitation speed $\omega_{E-CMD}$. When the value of the error $E_{MV1}$ is equal to zero, the first regulator 25 is in a steady-state condition and the value of the commanded value of excitation speed $\omega_{E-CMD}$ does not change. When the value of the error $E_{MV1}$ is positive or negative, the value of the commanded value of excitation speed $\omega_{E-CMD}$ is ramped up or down, respectively. The new commanded value of the excitation speed $\omega_{E-CMD}$ is supplied to the frequency-to-voltage converter 30 and to the modulator 35.

In one embodiment, the first regulator 25 uses proportional-integral (PI) control, where the relationship between the input and the output is explained by the following equation:

$$\omega_{E-CMD} = K_1 \frac{\tau_1 s + 1}{s} \cdot E_{MV1} \qquad [e1]$$

where the constant $K_1$ represents the gain of the first regulator 25 and the time constant $\tau_1$ represents the time constant of the zero of the first regulator 25. The values of the constant $K_1$ and time constant $\tau_1$ determine how quickly the first regulator 25 reaches a steady-state condition. The rate at which the first regulator 25 adapts toward the steady-state condition can be varied based on the requirements of the application in which the motor 10 is utilized. In one embodiment, the values of the constant $K_1$ and time constant $\tau_1$ are determined empirically based on the rated conditions of the motor 10. Other embodiments of the first regulator 25 utilize other techniques for establishing the values of the constant $K_1$ and time constant $\tau_1$. Other embodiments of the first regulator 25 use a proportional-integral-derivative (PID) control, or other type of control capable of generating an output based on an input of the error $E_{MV1}$.

The frequency-to-voltage converter 30 receives the commanded value of excitation speed $\omega_{E-CMD}$ as an input and generates an output of a commanded value of motor voltage $V_{1-CMD}$. In one embodiment, the relationship between the commanded value of excitation speed $\omega_{E-CMD}$ and the commanded value of motor voltage $V_{1-CMD}$ is based on the flux of the motor 10. Other embodiments of the frequency-to-voltage converter 30 utilize other relationships between the commanded value of excitation speed $\omega_{E-CMD}$ and the commanded value of motor voltage $V_{1-CMD}$. The commanded value of the motor voltage $V_{1-CMD}$ is supplied to the modulator 35.

The modulator 35 receives the commanded value of excitation speed $\omega_{E-CMD}$ and the commanded value of motor voltage $V_{1-CMD}$ as inputs and generates a modulated output. In one embodiment, the modulated output includes at least one command signal CS. Each command signal CS may include a duty cycle that is determined based at least in part on a ratio of the commanded value of motor voltage $V_{1-CMD}$ to a DC bus voltage $V_{DC}$ of the inverter 40. The amplitude of each command signals CS may be a nominal value (e.g., 5 volts DC, 15 volts DC, etc.). The number of command signals CS generated depends on the number of switches in the inverter 40 that need to be controlled and the method of control utilized (e.g., a three-phase power inverter may include six switches, a top switch and a bottom switch for each phase, where each phase is controlled by a separate command signal CS (i.e., three command signals CS), or where each switch is controlled by a separate command signal CS (i.e., six command signals CS)). In one embodiment, the modulator 35 includes a sine-triangle modulation scheme having a carrier frequency of 20 KHz. Other embodiments include other modulation schemes.

The inverter 40 receives each command signal CS as an input and generates an output of a motor voltage $V_1$ (e.g., a three-phase alternating current (AC) voltage) that is then fed to the motor 10. The motor voltage $V_1$ continuously energizes the motor 10 until the value of the motor voltage $V_1$ is updated. In one embodiment, the inverter 40 includes a power inverter having a bridge circuit for generating a three-phase voltage for use by a three-phase induction motor. Other embodiments of the inverter 40 include other types of inverters (e.g., a current sourced inverter, other voltage sourced inverters, etc.) that energize the motor 10 based on an input of at least one command signal CS.

The inverter 40 includes a top node or DC voltage bus and a bottom node or DC current bus. A DC voltage signal is delivered to the DC voltage bus for use in generating the motor voltage $V_1$. In one embodiment, the DC voltage signal is 300 volts DC and is obtained by rectifying an AC line voltage. Other embodiments of the DC voltage bus may include other values of DC voltage signals.

The measuring circuit 45 measures a value of DC bus voltage $V_{DC}$ and a value of DC bus current $I_{DC}$. The DC bus voltage $V_{DC}$ is measured "directly" (after stepping down the voltage), and the DC bus current $I_{DC}$ is measured using the current sensor 47 (e.g., a small resistor connected to the bottom node of the inverter 40) that allows for measurement of a voltage that corresponds to the DC bus current $I_{DC}$. In one embodiment, the current sensor 47 is sized such that the power drop in the inverter 40 is minimized. In some embodiments, an amplifier may be utilized to amplify the measured value of the voltage that corresponds to the DC bus current $I_{DC}$. An analog-to-digital (A/D) converter can be utilized to convert the measured analog signals to digital signals. The values of the DC bus voltage and current $V_{DC}$ and $I_{DC}$, respectively, are supplied to the calculator 55.

The calculator 55 receives the values of the DC bus voltage $V_{DC}$ and the DC bus current $I_{DC}$ as inputs and calculates an estimated value of a second motor variable $MV2_{EST}$ based at least in part on the values of DC bus voltage and DC bus current. The estimated value $MV2_{EST}$ is supplied to the second comparator 60.

The second comparator 60 compares the estimated value of the second motor variable $MV2_{EST}$ and a modeled value of the second motor variable $MV2_{MODEL}$. The second comparator 60 outputs an error $E_{MV2}$ that represents the difference between the estimated value $MV2_{EST}$ and the modeled value $MV2_{MODEL}$. The modeled value $MV2_{MODEL}$ is determined by the motor model module 70 as discussed below. The error $E_{MV2}$ is supplied to the second regulator 65. If the estimated and modeled values $MV2_{EST}$ and $MV2_{MODEL}$, respectively, are the same value, the value of the error $E_{MV2}$ is equal to zero.

The second regulator 65 receives the error $E_{MV2}$ as an input and generates an output of an estimated value of slip $S_{EST}$. The second regulator 65 increments or decrements the previous value of the estimated value of slip $S_{EST}$ based on the value of the error $E_{MV2}$, thereby generating a new value for the estimated value of slip $S_{EST}$. When the value of the error $E_{MV2}$ is equal to zero, the second regulator 65 is in a steady-state condition and the value of the estimated value of slip $S_{EST}$ does not change. When the value of the error $E_{MV2}$ is positive or negative, the value of the estimated value of slip $S_{EST}$ is ramped up or down, respectively. The new estimated value of the slip $S_{EST}$ is supplied to the motor model module 70.

In one embodiment, the second regulator 65 uses PI control, where the relationship between the input and the output is explained by the following equation:

$$S_{EST} = K_2 \frac{\tau_2 s + 1}{s} \cdot E_{MV2} \quad [e2]$$

where the constant $K_2$ represents the gain of the second regulator 65 and the time constant $\tau_2$ represents the time constant of the zero of the second regulator 65. The values of the constant $K_2$ and time constant $\tau_2$ determine how quickly the second regulator 65 reaches a steady-state condition. The rate at which the second regulator 65 adapts toward the steady-state condition can be varied based on the requirements of the application in which the motor 10 is utilized. In one embodiment, the values of the constant $K_2$ and time constant $\tau_2$ are determined empirically based on the rated conditions of the motor 10. Other embodiments of the second regulator 65 utilize other techniques for establishing the values of the constant $K_2$ and time constant $\tau_2$. Other embodiments of the second regulator 65 use a proportional-integral-derivative (PID) control, or other type of control capable of generating an output based on an input of the error $E_{MV2}$.

The motor model module 70 receives the estimated value of slip $S_{EST}$ and a number of motor parameter values as inputs, and generates the modeled values of the first and second motor variable $MV1_{MODEL}$ and $MV2_{MODEL}$, respectively, based at least in part on the estimated value of slip $S_{EST}$. In one embodiment, the values of the motor parameters are based on the rated conditions of the motor. The modeled values $MV1_{MODEL}$ and $MV2_{MODEL}$ are utilized as feedback inputs that adjust the commanded value $MV1_{CMD}$ and the estimated value $MV2_{EST}$, respectively, to control the first motor variable MV1 of the motor 10. In one embodiment, initial condition of the second regulator 65 are utilized to provide an estimated value of slip $S_{EST}$ that is utilized to generate the modeled values $MV1_{MODEL}$ and $MV2_{MODEL}$ for the first iteration of the controller 15 loop. Other embodiments of the motor model module 70 utilize other techniques (e.g., an initial condition for the modeled values $MV1_{MODEL}$ and $MV2_{MODEL}$, use of a zero value for the modeled values $MV1_{MODEL}$ and $MV2_{MODEL}$, etc.).

The controller 15B provides control of a combination of the variables of the motor 10 discussed above. To perform such control, the controller 15B includes the components of the controller 15A and a second calculator 75, a third comparator 80, and a third regulator 85. The controller 15B controls the operation of the motor 10 by controlling the first motor variable MV1 of the motor 10 and a third motor variable MV3 of the motor 10 using the second motor variable MV2 of the motor 10.

The second calculator 75 receives the estimated value of slip $S_{EST}$ as an input and calculates an estimated value of the third motor variable $MV3_{EST}$. The estimated value $MV3_{EST}$ is supplied to the third comparator 80. Similar to the modeled values $MV1_{MODEL}$ and $MV2_{MODEL}$, the initial value of the estimated value $MV3_{EST}$ can be determined using a number of techniques.

The third comparator 80 compares a commanded value of the third motor variable $MV3_{CMD}$ and the estimated value of the third motor variable $MV3_{EST}$. The third comparator 80 outputs an error $E_{MV3}$ that represents the difference between the commanded value $MV3_{CMD}$ and the estimated value $MV3_{EST}$. In one embodiment, the commanded value $MV3_{CMD}$ is provided based at least in part on a user input to the environment of the motor 10 and the controller 15. The error $E_{MV3}$ is supplied to the third regulator 85. If the commanded and estimated values $MV3_{CMD}$ and $MV3_{EST}$, respectively, are the same value, the value of the error $E_{MV3}$ is equal to zero.

The third regulator 85 receives the error $E_{MV3}$ as an input and generates an output of the commanded value of the first motor variable $MV1_{CMD}$. The third regulator 85 increments or decrements the previous value of the commanded value of the first motor variable $MV1_{CMD}$ based on the value of the error $E_{MV3}$, thereby generating a new value for the commanded value of the first motor variable $MV1_{CMD}$. When the value of the error $E_{MV3}$ is equal to zero, the third comparator 85 is in a steady-state condition and the value of the commanded value of the first motor variable $MV1_{CMD}$ does not change. When the value of the error $E_{MV3}$ is positive or negative, the value of the commanded value of the first motor variable $MV1_{CMD}$ is ramped up or down, respectively. The new commanded value of the first motor variable $MV1_{CMD}$ is supplied to first comparator 20 as discussed above. In this embodiment, the commanded value $MV1_{CMD}$ is not directly based on a user input, but indirectly based on a user input.

In one embodiment, the third regulator 85 uses a PI control, where the relationship between the input and the output is explained by the following equation:

$$MV1_{CMD} = K_3 \frac{\tau_3 s + 1}{s} \cdot E_{MV3} \quad [e3]$$

where the constant $K_3$ represents the gain of the third regulator 85 and the time constant $\tau_3$ represents the time constant of the zero of the third regulator 85. The values of the constant $K_3$ and time constant $\tau_3$ determine how quickly the third regulator 85 reaches a steady-state condition. The rate at which the third regulator 85 adapts toward the steady-state condition can be varied based on the requirements of the application in which the motor 10 is utilized. In one embodiment, the values of the constant $K_3$ and time constant $\tau_3$ are determined empirically based on the rated conditions of the motor 10. Other embodiments of the third regulator 85 utilize other techniques for establishing the values of the constant $K_3$ and time constant $\tau_3$. Other embodiments of the third regulator 85 use a proportional-integral-derivative (PID) control, or other type of control capable of generating an output based on an input of the error $E_{MV3}$.

FIG. 2 schematically illustrates the motor 10 connected to the controller 15 where the controller includes controllers 15AT and 15BST. The controller 15AT effects torque control of the motor 10, and the controller 15BST effects speed and torque control of the motor 10. Control of the speed and/or torque variables of the motor 10 may be useful in a number of applications (e.g., CFM control on the blower of an HVAC system). As discussed above, the controller 15 provides control of an individual variable or a combination of variables of the motor 10. The controllers 15AT and 15BST are two such examples.

The controller 15AT includes the same components as discussed above with respect to the controller 15A. The controller 15AT controls the torque T of the motor 10 using the real part of the current or the torque producing current $I_T$ of the motor 10.

The first comparator 20 compares a commanded value of torque $T_{CMD}$ and a modeled value of torque $T_{MODEL}$. The commanded value of torque $T_{CMD}$ can be provided directly, or indirectly via the third regulator 85. The first comparator 20 outputs an error $E_T$ that represents the difference between the commanded value $T_{CMD}$ and the modeled value $T_{MODEL}$. The first regulator 25 receives the error $E_T$ as an input and generates an output of a commanded value of excitation speed $\omega_{E\text{-}CMD}$. The commanded value of excitation speed $\omega_{E\text{-}CMD}$ is utilized along with the commanded value of motor voltage $V_{1\text{-}CMD}$ to generate the motor voltage $V_1$ that energizes the motor 10.

In addition to the values of DC bus voltage $V_{DC}$ and DC bus current $I_{DC}$, the first calculator 55 also receives the commanded value of motor voltage $V_{1\text{-}CMD}$ as an input. The first calculator 55 calculates an estimated value of the torque producing current $I_{T\text{-}EST}$ using the following equation:

$$I_{T\text{-}EST} = K_4 \frac{\mathit{Eff}_{INVERTER} V_{DC} I_{DC}}{V_{1\text{-}CMD}} \quad [e4]$$

where the constant $K_4$ represents a scaling factor (e.g., a scaling factor based on the type of motor voltage $V_1$ utilized (e.g., a single phase motor voltage, a three phase motor voltage, etc.)), and the efficiency of the inverter $EFF_{INVERTER}$ represents the power loss in the inverter 40.

The estimated value of torque producing current $I_{T\text{-}EST}$ equation (e4) is obtained using the interrelationships of power entering and exiting the inverter 40 and the motor 10. The power input $P_{MOTOR\text{-}IN}$ of the motor 10 is described by the following equation:

$$P_{MOTOR\_IN} = V_1 I_1 \cos(\theta) = V_1 I_T \quad [e5]$$

where $V_1$ represents the motor voltage, $I_1$ represents the motor current (i.e., the current through the stator of the motor) (see motor model 100 below), $\cos(\theta)$ represents the power factor of the motor, and $I_1 \cos(\theta)$ represents the torque producing current $I_T$ (i.e., the real part of the current). The power input $P_{MOTOR\text{-}IN}$ of the motor 10 is equal to the power output $P_{INVERTER\text{-}OUT}$ of the inverter 40 as shown in the following equation:

$$P_{MOTOR\text{-}IN} = P_{INVERTER\text{-}OUT} \quad [e6]$$

Based on the conversation of energy, the power output $P_{INVERTER\text{-}OUT}$ of the inverter 40, and therefore the power input $P_{MOTOR\text{-}IN}$ of the motor 10, is equal to the power input $P_{INVERTER\text{-}IN}$ of the inverter 40 times the efficiency of the inverter $EFF_{INVERTER}$ as shown in the following equation:

$$P_{INVERTER\text{-}OUT} = P_{INVERTER\text{-}IN} EFF_{INVERTER} = P_{MOTOR\text{-}IN} \quad [e7]$$

The power input $P_{INVERTER\text{-}IN}$ of the inverter 40 is equal to the DC bus voltage $V_{DC}$ times the DC bus current $I_{DC}$ as shown in the following equation:

$$P_{INVERTER\text{-}IN} = V_{DC} I_{DC} \quad [e8]$$

By substituting the power input $P_{INVERTER\text{-}IN}$ of the inverter 40 equation (e8) and the power output $P_{INVERTER\text{-}OUT}$ of the inverter 40 equation (e7) into the power input $P_{MOTOR\text{-}IN}$ of the motor 10 equation (e5), solving for the real part of the current or the torque producing current $I_T$, and substituting the variables of the controller 15 for the corresponding variables of the model 200 (e.g., $I_{T\text{-}EST} = I_T$, $V_{1\text{-}CMD} = V_1$) the estimated value of torque producing current $I_{T\text{-}EST}$ equation (e4) is obtained.

The second comparator 60 compares the estimated value of the torque producing current $I_{T\text{-}EST}$ and a modeled value of the torque producing current $I_{T\text{-}MODEL}$. The second comparator 60 outputs an error $E_T$ that represents the difference between the estimated and modeled values $I_{T\text{-}EST}$ and $I_{T\text{-}MODEL}$, respectively. The second regulator 65 receives the error $E_T$ as an input and generates an output of an estimated value of slip $S_{EST}$.

In addition to the estimated value of slip $S_{EST}$, the motor model module 70 receives the commanded values of excitation speed and motor voltage $\omega_{E\text{-}CMD}$ and $V_{1\text{-}CMD}$, respectively, and based on a model of the motor 10, generates the modeled values of torque and torque producing current $T_{MODEL}$ and $I_{T\text{-}MODEL}$.

Figure 3:
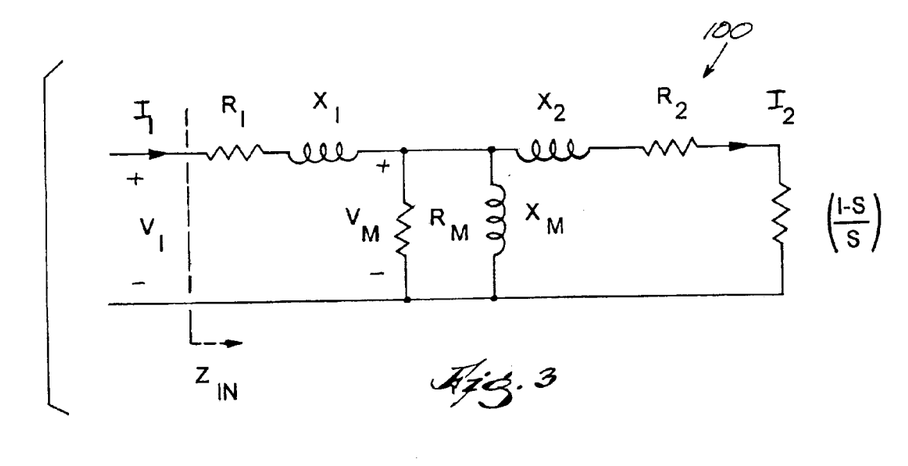
FIG. 3 is a schematic diagram of a lumped parameter induction motor model of the motor shown in FIG. 1.

FIG. 3 illustrates a lumped parameter induction motor model 100 of the motor 10 where, for each phase of the motor 10, $R_1$ represents the resistance of the stator, $X_1$ represents the reactance of the stator, $R_2$ represents the resistance of the rotor that corresponds to the resistance $R_1$, $X_2$ represents the reactance of the rotor that corresponds to the reactance $X_1$, $R_M$ represents the resistance associated with core losses, $X_M$ represents the magnetizing reactance, $V_1$ represents the motor voltage that energizes the stator of the motor 10, and S is the slip of the motor. Values of the resistances $R_1$ and $R_{2P}$ and the reactances $X_{1P}$ and $X_{MP}$ are based on the rated motor parameter values. A rated value of slip S is also available, although slip S varies during the operation of the motor 10 based on the load and speed of the motor 10.

Figure 4:
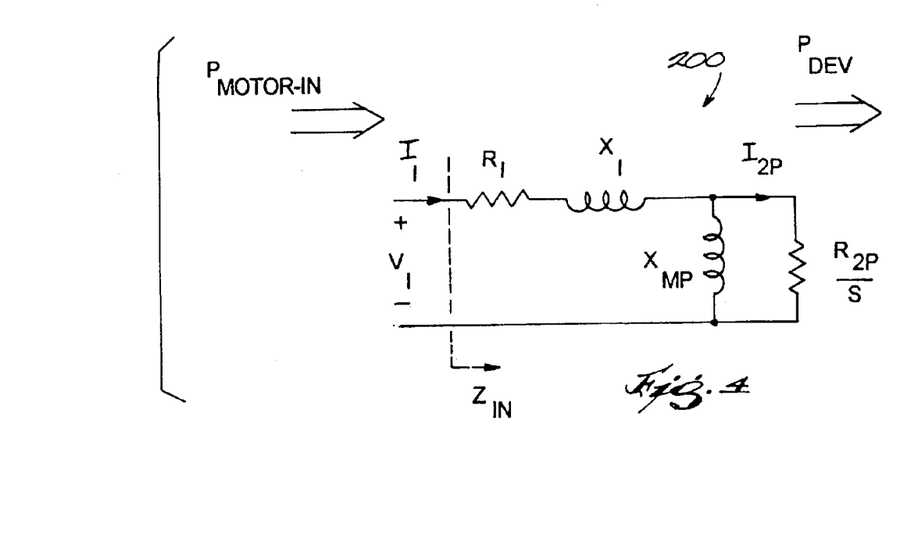
FIG. 4 is a schematic diagram of an induction motor model that neglects the effects of core losses.

The lumped parameter model 100 is simplified to the induction motor model 200 shown in FIG. 4 by neglecting the affects of core loss and using the following equations:

$$X_S = X_1 + X_M \quad [e9]$$

$$X_R = X_2 + X_M \quad [e10]$$

$$X_{MP} = \frac{X_M^2}{X_R} \quad [e11]$$

$$X_{1P} = \left(X_s - \frac{X_M^2}{X_R}\right) \quad [e12]$$

$$R_{2P} = \left(\frac{X_M}{X_R}\right)^2 \quad [e13]$$

The input impedance $Z_{IN}$ of the model 200 is represented by the following equation:

$$Z_{IN} = R_1 + j\omega_E X_{1P} + \frac{j\omega_E X_{MP}\left(\frac{R_{2P}}{S}\right)}{j\omega_E X_{MP} + \left(\frac{R_{2P}}{S}\right)} \quad [e14]$$

Further, the motor current $I_1$ of the model 200 is represented by the following equation:

$$I_1 = \frac{V_1}{Z_{IN}} \quad [e15]$$

By substituting the input impedance $Z_{IN}$ equation (e14) the motor current $I_1$ equation (e15), solving for the real part of the current or the torque producing current $I_T$, and substituting the variables of the controller 15 for the corresponding variables of the model 200 (e.g., $I_{T\text{-}MODEL}=I_T$, $\omega_{E\text{-}CMD}=\omega_E$, $S_{EST}=S$, $V_{1\text{-}CMD}=V_1$), the following equation is obtained:

$$I_{T-MODEL} = \frac{A}{B+C} \quad [e16]$$

where $$A = V_{1\text{-}CMD}(R_1 R_{2P}^2 + R_1 \omega_{E\text{-}CMD}^2 X_{MP}^2 S_{CALC}^2 + \omega_{E\text{-}CMD}^2 X_{MP}^2 R_{2P} S_{CALC}) \quad [e17]$$

$$B = S_{CALC}^2 X_{MP}^2 X_{1P}^2 \omega_{E\text{-}CMD}^4 + S_{CALC}^2 X_{MP}^2 R_1^2 \omega_{E\text{-}CMD}^2 + 2R_1 R_{2P} \omega_{E\text{-}CMD}^2 X_{MP}^2 S_{CALC} \quad [e18]$$

$$C = (R_{2P}^2 X_{MP}^2 + 2X_{1P}^2 R_{2P} X_{MP} + X_{1P}^2 R_{2P}^2)\omega_{E\text{-}CMD}^2 + R_1^2 R_{2P}^2 \quad [e19]$$

In one embodiment of the motor model module 70, the modeled value of torque producing current $I_{T\text{-}MODEL}$ is generated based on the model 200 of the motor 10 that includes the above modeled value of torque producing current $I_{T\text{-}MODEL}$ equation (e16).

Based on the model 200, the power developed $P_{DEV}$ by the motor 10 is represented by the following equation:

$$P_{DEV} = I_{2P}^2 \frac{R_{2P}}{S} \quad [e20]$$

Further, the torque T of the motor 10 is represented by the following equation:

$$T = \frac{P_{DEV}}{(1-S)\omega_E} \quad [e21]$$

By substituting the power developed $P_{DEV}$ equation (e20) into the torque T equation (e21), utilizing only the portion of the resulting equation that represents the real part of the current based on the interrelationship between the motor current $I_1$ and the current $I_{2P}$, and substituting the variables of the controller 15 for the corresponding variable of the model 200 (e.g., $T_{MODEL}=T$, $\omega_{E\text{-}CMD}=\omega_E$, $S_{CALC}=S$, $V_{1\text{-}CMD}=V_1$), the following equation is obtained:

$$T_{MODEL} = \frac{E}{B+C} \quad [e22]$$

where $$E = V_{1\text{-}CMD}^2 X_{MP}^2 \omega_{E\text{-}CMD} R_{2P} \quad [e23]$$

and B and C are defined in eqs. 18 and 19. Utilization of the equations (e16 and e22) having the same denominator reduces the amount of processing power necessary to control the operation of the motor 10.

In one embodiment of the motor model module 70, the modeled value of torque $T_{MODEL}$ is generated based on the model 200 of the motor 10 that includes the above modeled value of torque $T_{MODEL}$ equation (e22).

Other embodiments of the motor model module 70 include other equations based on the model 200, equations based on other models of the motor 10, look-up tables having values based on the model 200 or other models, etc.

The controller 15BST includes the same components as discussed above with respect to the controller 15B. The controller 15BST controls the torque T and the output speed $\omega_R$ of the motor 10 using the torque producing current $I_T$ of the motor 10.

The second calculator 75 receives the estimated value of slip $S_{EST}$ and the commanded value of excitation speed $\omega_{E\text{-}CMD}$ as inputs and calculates an estimated value of output speed $\omega_{R\text{-}EST}$ based on the following equation:

$$\omega_{R\text{-}MODEL} = (1-S_{EST})\omega_{E\text{-}CMD} \quad [e24]$$

The third comparator 80 compares a commanded value of the output speed $\omega_{R\text{-}CMD}$ and the estimated value of the output speed $\omega_{R\text{-}EST}$. The third comparator 80 outputs an error $E_{\omega R}$ that represents the difference between the commanded value $\omega_{R\text{-}CMD}$ and the estimated value $\omega_{R\text{-}EST}$. The third regulator 85 receives the error $E_{\omega R}$ as an input and generates an output of the commanded value of torque $T_{CMD}$ which is utilized as discussed above.

In an alternative embodiment, the controller 15AT controls the torque T and the controller 15BST controls the torque T and the output speed $\omega_R$ of the motor 10 using the motor current $I_1$ instead of the torque producing current $I_T$ of the motor 10. The control is similar to that discussed above with respect to the use of torque producing current $I_T$ except that motor current $I_1$ is the second motor variable MV2 instead of torque producing current $I_T$. The first calculator 55 calculates an estimated value of motor current $I_{1-EST}$ using the following equation:

$$I_{1-EST} = K_4 \frac{Eff_{INVERTER} V_{DC} I_{DC}}{V_{1-CMD} \cos\theta} \quad [e25]$$

The estimated value of motor current $I_1$ equation (e25) is obtained by substituting the power input $P_{INVERTER-IN}$ of the inverter 40 equation (e8) and the power output $P_{INVERTER-OUT}$ of the inverter 40 equation (e7) into the power input $P_{MOTOR-IN}$ of the motor 10 equation (e5), solving for the motor current $I_1$, and substituting the variables of the controller 15 for the corresponding variables of the model 200 (e.g., $I_{1-EST} = I_1$, $V_{1-CMD} = V_1$). A modeled value of motor current $I_{1-MODEL}$ is generated based on the model 200 of the motor 10 that includes a modeled value of motor current equation developed in a fashion similar to the above modeled value of torque producing current $I_{T-MODEL}$ equation (e16). A value of the power factor $\cos\theta$ for use in calculating the estimated and modeled values of motor current $I_{1-EST}$ and $I_{1-MODEL}$ can be obtained in a number of ways. In one embodiment, a value of the power factor $\cos\theta$ is obtained by determining the zero crossing of the motor current $I_1$ waveform at the output of the inverter 40, and comparing that zero crossing to the waveform of the commanded voltage $V_{1-CMD}$.

In another alternative embodiment, the controller 15AT controls the torque T and the controller 15BST controls the torque T and the output speed $\omega_R$ of the motor 10 using the power factor $\cos\theta$ instead of the torque producing current $I_T$ of the motor 10. The control is similar to that discussed above with respect to the use of torque producing current $I_T$ except that power factor $\cos\theta$ is the second motor variable MV2. The first calculator 55 calculates an estimated value of power factor $\cos\theta_{EST}$ using the following equation:

$$\cos\theta_{EST} = K_4 \frac{Eff_{INVERTER} V_{DC} I_{DC}}{V_{1-CMD} I_1} \quad [e26]$$

The estimated value of power factor $\cos\theta_{EST}$ equation (e26) is obtained by substituting the power input $P_{INVERTER-IN}$ of the inverter 40 equation (e8) and the power output $P_{INVERTER-OUT}$ of the inverter 40 equation (e7) into the power input $P_{MOTOR-IN}$ of the motor 10 equation (e5), solving for the power factor $\cos\theta$, and substituting the variables of the controller 15 for the corresponding variables of the model 200 (e.g., $V_{1-CMD} = V_1$). A modeled value of power factor $\cos\theta_{MODEL}$ is generated based on the model 200 of the motor 10 that includes a modeled value of power factor equation developed in a fashion similar to the above modeled value of torque producing current $I_{T-MODEL}$ equation (e16). A value of the motor current $I_1$ for use in calculating the estimated and modeled values of power factor $\cos\theta_{EST}$ and $\cos\theta_{MODEL}$ can be obtained in a number of ways. In one embodiment, a value of the motor current $I_1$ is obtained by rectifying the motor current $I_1$ at the output of the inverter 40 to obtain an RMS value of the motor current $I_1$.

Thus, the invention provides, among other things, a new and useful method of and apparatus for controlling the operation of an induction motor using a model of the induction motor. Various features of the invention are set forth in the following claims.

What is claimed is:

1. A method of controlling an induction motor, the method comprising:

providing a model of the motor, wherein the model is utilized to provide a modeled value of torque and a modeled value of torque producing current;

supplying a voltage to the motor to energize the motor;

providing a commanded value of torque;

measuring a bus voltage and a bus current;

determining an estimated value of torque producing current based at least in part on the bus voltage and the bus current;

comparing the estimated and modeled values of torque producing current to determine a torque producing current error;

using the model to determine an updated modeled value of torque based at least in part on the torque producing current error;

adjusting the voltage supplied to the motor based at least in part on the updated modeled value of torque.

2. The method of claim 1, wherein the model includes an equation representing the motor.

3. The method of claim 1, wherein the model includes an induction motor model that neglects the effects of core losses on the motor.

4. The method of claim 1, wherein the model includes a look-up table representing the motor.

5. The method of claim 1, wherein the voltage includes a three-phase, alternating current (AC) voltage.

6. The method of claim 1, wherein the act of supplying a voltage includes supplying the voltage with an inverter, the inverter including the bus voltage and the bus current.

7. The method of claim 6, wherein the bus voltage is a direct current (DC) bus voltage and the bus current is a DC bus current, and wherein the act of measuring a bus voltage and a bus current includes measuring the DC bus voltage and measuring the DC bus current.

8. The method of claim 1, further comprising providing a commanded value of output speed;

determining an estimated value of output speed based at least in part on the torque producing current error;

comparing the commanded and estimated values of output speed to determine an output speed error; and determining the commanded value of torque based at least in part on the output speed error.

9. The method of claim 1, further comprising comparing the commanded and updated modeled values of torque to determine a torque error, wherein the voltage supplied to the motor is adjusted based at least in part on the torque error.

10. The method of claim 9, further comprising determining a commanded value of excitation speed based at least in part on the torque error; and determining a commanded value of motor voltage based at least in part on the commanded value of excitation speed.

11. The method of claim 10, further comprising determining a command signal based at least in part on the commanded values of excitation speed and motor voltage; and adjusting the voltage based at least in part on the command signal.

12. The method of claim 1, further comprising
determining an estimated value of slip based at least in part on the torque producing current error; and
using the model to determine an updated modeled value of torque based at least in part on the estimated value of slip.

13. A method of controlling an induction motor, the method comprising:
providing a model of the motor, wherein the model is utilized to provide a modeled value of torque and a modeled value of power factor;
supplying a voltage to the motor to energize the motor;
providing a commanded value of torque;
measuring a bus voltage and a bus current;
determining an estimated value of power factor based at least in part on the bus voltage and the bus current;
comparing the estimated and modeled values of power factor to determine a power factor error;
using the model to determine an updated modeled value of torque based at least in part on the power factor error;
adjusting the voltage supplied to the motor based at least in part on the updated modeled value of torque.

14. A method of controlling an induction motor, the method comprising:
providing a model of the motor, wherein the model is utilized to provide a modeled value of torque and a modeled value of motor current;
supplying a voltage to the motor to energize the motor;
providing a commanded value of torque;
measuring a bus voltage and a bus current;
determining an estimated value of motor current based at least in part on the bus voltage and the bus current;
comparing the estimated and modeled values of motor current to determine a motor current error;
using the model to determine an updated modeled value of torque based at least in part on the motor current error;
adjusting the voltage supplied to the motor based at least in part on the updated modeled value of torque.

15. A method of controlling a motor, the method comprising the acts of:
providing a model of the motor, wherein the model is utilized to provide a modeled value of a first motor variable and a modeled value of a second motor variable;
supplying a voltage to the motor with an inverter, the inverter including a bus voltage and a bus current;
providing a commanded value of the first motor variable;
measuring the bus voltage and the bus current;
determining an estimated value of the second motor variable based at least in part on the bus voltage and the bus current;
comparing the estimated and modeled values of the second motor variable to determine a second motor variable error;
using the model to determine an updated modeled value of the first motor variable based at least in part on the second motor variable error;
adjusting the voltage supplied to the motor based at least in part on the modeled value of the first motor variable.

16. The method of claim 15, wherein the motor is an induction motor.

17. The method of claim 15, wherein the voltage includes an alternating current (AC) voltage.

18. The method of claim 17, wherein the AC voltage includes a three-phase AC voltage.

19. The method of claim 15, wherein the first motor variable is torque.

20. The method of claim 19, wherein the second motor variable is torque producing current.

21. The method of claim 19, wherein the second motor variable is power factor.

22. The method of claim 19, wherein the second motor variable is motor current.

23. The method of claim 15, wherein the first motor variable is one of speed, slip, efficiency, and flux.

24. The method of claim 15, wherein the second motor variable is one of speed, slip, efficiency, and flux.

25. The method of claim 15, wherein the model includes an equation representing the motor.

26. The method of claim 15, wherein the model includes an induction motor model that neglects the effects of core losses on the motor.

27. The method of claim 15, wherein the model includes a look-up table representing the motor.

28. The method of claim 15, wherein the bus voltage is a direct current (DC) bus voltage and the bus current is a DC bus current, and wherein the act of measuring the bus voltage and the bus current includes measuring the DC bus voltage and measuring the DC bus current.

29. The method of claim 15, further comprising determining an estimated value of slip based at least in part on the second motor variable error.

30. The method of claim 29, further comprising
providing a commanded value of a third motor variable;
determining an estimated value of the third motor variable based at least in part on the estimated value of slip;
comparing the commanded and estimated values of the third motor variable to determine a third motor variable error; and
determining the commanded value of the first motor variable based at least in part on the third motor variable error.

31. The method of claim 30, wherein the third motor variable is output speed.

32. The method of claim 30, wherein the third motor variable is one of torque, slip, efficiency, and flux.

33. The method of claim 15, further comprising comparing the commanded and updated modeled values of the first motor variable to determine a first motor variable error, wherein the voltage is adjusted based at least in part on the first motor variable error.

34. The method of claim 33, further comprising
determining a commanded value of excitation speed based at least in part on the first motor variable error; and
determining a commanded value of motor voltage based at least in part on the commanded value of excitation speed.

35. The method of claim 34, further comprising
determining a command signal based at least in part on the commanded values of excitation speed and motor voltage; and
adjusting the voltage based at least in part on the command signal.

36. The method of claim 15, further comprising
   determining an estimated value of slip based at least in part on the second motor variable error; and
   using the model to determine an updated modeled value of the first motor variable based at least in part on the estimated value of slip.

37. A controller for an induction motor having a first motor variable and a second motor variable, the controller comprising:
   a motor model module configured to represent a motor, the motor model module having an input that receives an estimated value of slip and an output that outputs a modeled value of the first motor variable and a modeled value of the second motor variable;
   an inverter having a bus voltage and a bus current, the inverter supplying a voltage to the induction motor to energize the induction motor;
   a measuring circuit configured to measure the bus voltage and the bus current;
   a calculator configured to calculate an estimated value of the second motor variable based at least in part on the measured bus voltage and the measured bus current;
   a first comparator having an input that receives the estimated and modeled values of the second motor variable, and an output that outputs a second motor variable error;
   a regulator having an input that receives the second motor variable error, and an output that outputs the estimated value of slip; and
   a second comparator having an input that receives a commanded value of the first motor variable and the modeled value of a first motor variable, and an output that outputs a first motor variable error;
   wherein the voltage is determined based at least in part on the first motor variable error.

38. The controller of claim 37, wherein the measuring circuit includes a current sensor.

39. The controller of claim 37, wherein the measuring circuit includes an analog-to-digital (A/D) converter.

40. The controller of claim 37, wherein the second motor variable error represents the difference between the estimated and modeled values of the second motor variable.

41. The controller of claim 37, wherein the first motor variable error represents the difference between the commanded and modeled values of the first motor variable.

42. The controller of claim 37, wherein the first motor variable is torque.

43. The controller of claim 37, wherein the second motor variable is torque producing current.

44. The controller of claim 37, wherein the second motor variable is power factor.

45. The controller of claim 37, wherein the second motor variable is motor current.

46. The controller of claim 37, wherein the first motor variable is one of speed, slip, efficiency, and flux.

47. The controller of claim 37, wherein the second motor variable is one of speed, slip, efficiency, and flux.

48. The controller of claim 37, wherein the motor includes a third motor variable, and further comprising a second calculator having an input that receives the estimated value of slip and an output that outputs an estimated value of the third motor variable.

49. The controller of claim 48, further comprising a third comparator having an input that receives the estimated value of the third motor variable and a commanded value of the third motor variable, and an output that outputs a third motor variable error.

50. The controller of claim 49, wherein the commanded value of the first motor variable is based at least in part on the third motor variable error.

51. The controller of claim 48, wherein the third motor variable is output speed.

52. A controller for an induction motor having a first motor variable, the controller comprising:
   an inverter having a bus voltage and a bus current, the inverter being operable to receive a command signal, and to supply a voltage to the induction motor based at least in part on the command signal;
   a measuring circuit operable to measure a value of the bus voltage and a value of the bus current;
   a programmable device operable to generate an estimated value of slip based at least in part on the measured values of the bus voltage and the bus current, to maintain a model of the induction motor, and to adjust the command signal based at least in part on a modeled value of the first motor variable generated using the model, the modeled value of the first motor variable being based at least in part on the estimated value of slip.

53. The controller of claim 52, wherein the induction motor has a second motor variable, and wherein the programmable device is further operable to generate a modeled value of the second motor variable using the model.

54. The controller of claim 53, wherein the programmable device is further operable to calculate an estimated value of the second motor variable based at least in part on the measured values of the bus voltage and the bus current.

55. The controller of claim 54, wherein the programmable device is further operable to generate a second motor variable error based at least in part on a comparison of the estimated and modeled values of the second motor variable, and wherein the estimated value of slip is generated based at least in part on the second motor variable error.

56. The controller of claim 53, wherein the second motor variable is torque producing current.

57. The controller of claim 53, wherein the second motor variable is power factor.

58. The controller of claim 53, wherein the second motor variable is motor current.

59. The controller of claim 52, wherein the programmable device is further operable to receive a commanded value of the first motor variable.

60. The controller of claim 59, wherein the programmable device is further operable to generate a first motor variable error based at least in part on a comparison of the commanded and modeled values of the first motor variable.

61. The controller of claim 60, wherein the command signal is adjusted based at least in part on the first motor variable error.

62. The controller of claim 52, wherein the induction motor has a second motor variable, and wherein the programmable device is further operable to receive a commanded value of the second motor variable and to generate a modeled value of the second motor variable using the model, the modeled value of the second motor variable being based at least in part on the estimated value of slip.

63. The controller of claim 62, wherein the programmable device is further operable to generate a second motor variable error based at least in part on a comparison of the commanded and modeled values of the second motor variable.

64. The controller of claim 63, wherein the command signal is adjusted based at least in part on the second motor variable error.

65. The controller of claim 64, wherein the second motor variable is output speed.

66. The controller of claim 52, wherein the first motor variable is torque.

\* \* \* \* \*